UNITED STATES PATENT OFFICE.

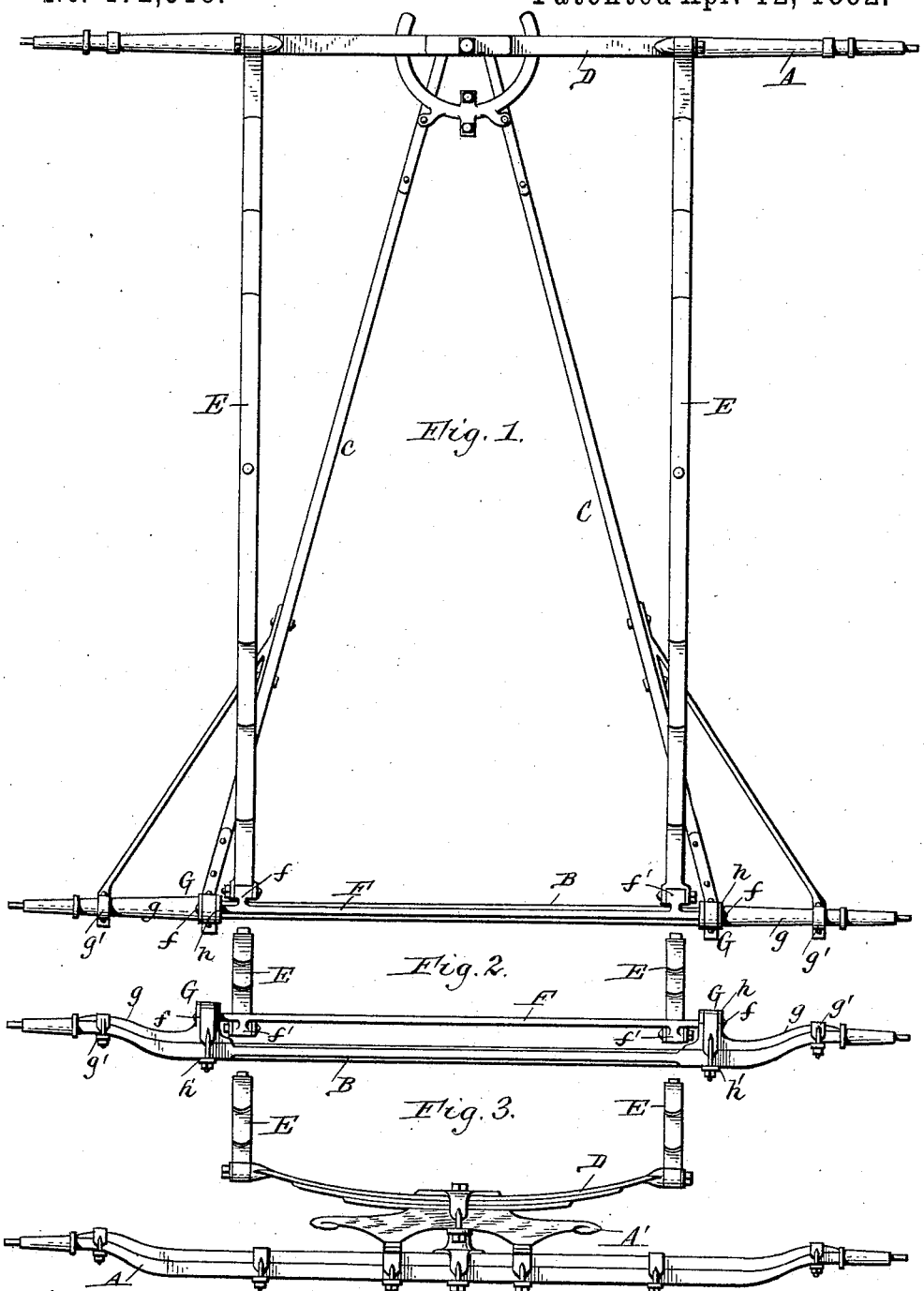

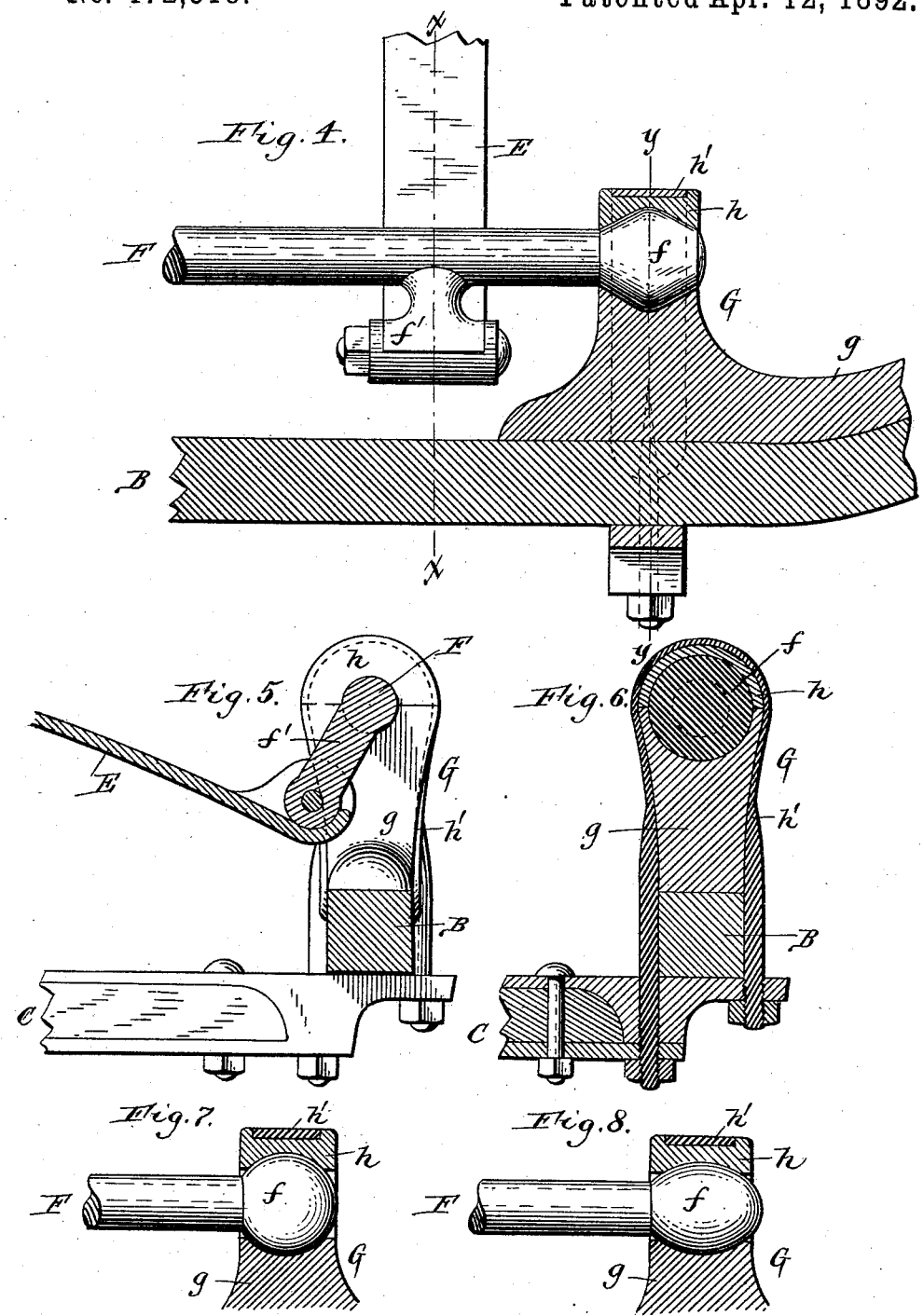

CHRISTOPHER C. BRADLEY, OF SYRACUSE, NEW YORK.

SPRING-VEHICLE.

SPECIFICATION forming part of Letters Patent No. 472,518, dated April 12, 1892.

Application filed December 17, 1891. Serial No. 415,325. (No model.)

*To all whom it may concern:*

Be it known that I, CHRISTOPHER C. BRADLEY, a citizen of the United States, residing at Syracuse, in the county of Onondaga and State of New York, have invented a new and useful Improvement in Spring-Vehicles, of which the following is a specification.

This invention relates to the running-gear of a spring-vehicle in which the body is supported by longitudinal side springs which are connected at their rear ends to an equalizing-rod journaled in bearings arranged on the rear axle.

The objects of my invention are to improve the journals of the equalizing-rod and to provide a yielding support for the front ends of the side springs.

In the accompanying drawings, consisting of two sheets, Figure 1 is a top plan view of my improved running-gear. Figs. 2 and 3 are rear and front elevations thereof, respectively. Fig. 4 is a vertical longitudinal section of one of the bearings of the equalizing-rod and connecting parts on an enlarged scale. Figs. 5 and 6 are vertical transverse sections in lines $x\,x$ and $y\,y$, Fig. 4, respectively. Figs. 7 and 8 are sectional elevations representing modified forms of the equalizing-rod journals.

Like letters of reference refer to like parts in the several figures.

A represents the front axle; A', the head-block secured thereto; B, the rear axle, and C the double reach connecting the front and rear axles.

D represents a semielliptic cross-spring, which is secured to the top of the front head-block.

E E represent the longitudinal side springs, which support the body and are attached with their front ends to opposite ends of the cross-spring by transverse pivots projecting from the ends of the cross-spring and entering eyes in the side springs. By supporting the front ends of the side springs on a cross-spring the front ends of the side springs are permitted to yield, thereby producing an easier-riding vehicle.

F represents the equalizing-rod, which supports the rear ends of the side springs. This rod is arranged lengthwise over the rear axle and is provided at its ends with knuckles $f\,f$ which are journaled in bearings G G, arranged upon the rear axle. The eqalizing-rod is provided near opposite ends and on the inner sides of its bearings with depending lugs $f'$, to which the rear ends of the side springs are pivoted by transverse bolts. The body of the axle is preferably depressed below the arms to compensate for the height of the bearings of the equalizing-rod. Each of these bearings consists of a bed-piece $g$, secured with its outer end upon the rear axle by a clip $g'$ and a cap-piece $h$, which is secured to the bed-piece and axle by a clip $h'$. The knuckles of the equalizing-rod have the bearing-surface of each knuckle rising from both ends toward its middle, which causes each knuckle to center itself in the bearing and also prevents longitudinal movement of the equalizing-rod. For this purpose the bearing-surfaces of the knuckles and bearings are preferably V-shaped, as represented in Fig. 4; but, if desired, the knuckles and bearings may be spherical, as represented in Fig. 7, or oval, as represented in Fig. 8.

I claim as my invention—

1. The combination, with the front gear, the rear axle, and the side springs, of an equalizing-rod supporting the rear ends of the side springs and provided with knuckles having bearing-surfaces which rise from both ends toward the middle, and correspondingly-shaped bearings arranged upon the rear axle, substantially as set forth.

2. The combination, with the front gear, the rear axle, and the side springs, of an equalizing-rod provided at its ends with V-shaped knuckles, correspondingly-shaped bearings secured to the rear axle, and depending lugs formed on the equalizing-rod on the inner sides of its bearings and attached with their lower ends to the rear ends of the side springs, substantially as set forth.

3. The combination, with the front gear and the rear axle having a depressed body and raised arms, of bearings secured to the upper sides of the axle-body, an equalizing-rod arranged over the depressed body and journaled with its ends in said bearings, depending lugs secured to the equalizing-rod, side springs attached with their rear ends to the lugs of the equalizing-rod, and a transverse spring secured to the front gear and attached with its ends to the front ends of the side springs, substantially as set forth.

Witness my hand this 15th day of December, 1891.

CHRISTOPHER C. BRADLEY.

Witnesses:
 THEO. L. POPP,
 H. D. HAMMOND.